(12) United States Patent
Vahey et al.

(10) Patent No.: US 12,140,535 B2
(45) Date of Patent: Nov. 12, 2024

(54) SYSTEM, APPARATUS AND METHOD FOR RAPID EVALUATION OF LIGHT TRANSMISSION THROUGH OPAQUE COATINGS AND FILMS

(71) Applicant: The Boeing Company, Chicago, IL (US)

(72) Inventors: Paul Vahey, Seattle, WA (US); Jessica Adele Boze, Seattle, WA (US); Geoff M. House, Maple Valley, WA (US); Dara Ung, Lake Forest Park, WA (US); Karen A. Schultz, Seattle, WA (US); Nels Andrew Olson, Seattle, WA (US); Kenneth R. Block, Renton, WA (US); James F. Kirchner, Renton, WA (US); Maribel Gomez Locsin, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/540,982

(22) Filed: Dec. 2, 2021

(65) Prior Publication Data

US 2023/0175956 A1 Jun. 8, 2023

(51) Int. Cl.
*G01N 21/31* (2006.01)
*G01J 3/02* (2006.01)
(Continued)

(52) U.S. Cl.
CPC .......... *G01N 21/314* (2013.01); *G01J 3/0229* (2013.01); *G01J 3/10* (2013.01); *G01N 2021/8427* (2013.01)

(58) Field of Classification Search
CPC .......... G01N 21/314; G01N 2021/8427; G01J 3/0229; G01J 3/10
See application file for complete search history.

(56) References Cited

U.S. PATENT DOCUMENTS 4,737,651 A * 4/1988 Bauer ............... G01B 11/0625
356/429
8,598,535 B2 * 12/2013 Miura ................... G01N 21/33
250/372
(Continued)

FOREIGN PATENT DOCUMENTS

CN 201311393 Y 9/2009
JP H06 117931 A 4/1994
WO 2014092024 A1 6/2014

OTHER PUBLICATIONS

Uhov, A. A., et al. "Method of the coating thickness and transmittance control during the film deposition process." Journal of Physics: Conference Series. vol. 1313. No. 1. IOP Publishing, 2019 (Year: 2019).*

(Continued)

*Primary Examiner* — Tarifur R Chowdhury
*Assistant Examiner* — Roberto Fabian, Jr.
(74) *Attorney, Agent, or Firm* — Jordan IP Law, LLC

(57) ABSTRACT

Systems, apparatuses and methods for rapidly evaluating light transmission through coatings including paints, primers, thin films, surfacing films, laminates and the like are disclosed. The system includes a light source for transmitting light through a coating sample. A sample holder holds the coating sample in a position to receive the incident light. A spectrometer measures an amount of the transmitted light that passes through the coating sample. Optionally, one or more optical filters may be used to condition any transmitted light that passes through the coating sample to reduce the intensity of the light outside of wavelengths of interest. An opaque cover encloses the spectrometer, the one or more optional optical filters, and at least part of the sample holder to prevent light other than the transmitted light from the light source from entering the spectrometer such that any trans- (Continued)

mitted light passing through the coating sample can be accurately evaluated.

30 Claims, 10 Drawing Sheets

(51) Int. Cl.
    *G01J 3/10*     (2006.01)
    *G01N 21/84*     (2006.01)

(56) References Cited

U.S. PATENT DOCUMENTS

| | | | |
|---|---|---|---|
| 2002/0068228 A1* | 6/2002 | Kureishi | C23C 14/0052 430/311 |
| 2008/0032037 A1* | 2/2008 | Frey | G01N 21/8422 427/9 |
| 2013/0215413 A1* | 8/2013 | Lagerman | G01N 21/8422 356/73 |
| 2016/0282277 A1* | 9/2016 | Tixier | G01N 21/31 |
| 2017/0336319 A1 | 11/2017 | Hruska et al. | |
| 2019/0025197 A1* | 1/2019 | Zorn | G01N 21/251 |

OTHER PUBLICATIONS

Wilkes, T. C., et al. "Low-cost 3D printed 1 nm resolution smartphone sensor-based spectrometer: instrument design and application in ultraviolet spectroscopy." Optics letters 42.21 (2017): 4323-4326 (Year: 2017).*

Sigernes, Fred, et al. "Do it yourself hyperspectral imager for handheld to airborne operations." Optics express 26.5 (2018): 6021-6035 (Year: 2018).*

Nichols, Mark, et al. "An improved accelerated weathering protocol to anticipate Florida exposure behavior of coatings." Journal of Coatings Technology and Research 10 (2013): 153-173 (Year: 2013).*

Hardie Kayla et al., "Inexpensive LED-Based Optical Coating Sensor," IEEE Sensors Journal, IEEE, USA, vol. 17, No. 19, Oct. 1, 2017, pp. 6224-6231, XP011660158, ISSN: 1530-437X, DOI: 10.1109/USEN.2017.2740208.

Extended European Search Report, Application No. 22195644.4, dated Mar. 24, 2023.

* cited by examiner

SYSTEM, APPARATUS AND METHOD FOR RAPID EVALUATION OF LIGHT TRANSMISSION THROUGH OPAQUE COATINGS AND FILMS

TECHNICAL FIELD

Examples generally relate to measuring and evaluating light transmission. More particularly, examples relate to systems, apparatuses and methods for rapidly measuring and evaluating light transmission through opaque coatings including paints, primers, thin films, surfacing films, laminates, and the like.

BACKGROUND

Coatings such as paints, primers, thin films, surfacing films, laminates and the like are applied to underlying materials and components in order to protect, improve the performance, and extend the life of the underlying materials and components. These coatings are used in many industries and applications including, for example, the aerospace industry to protect airplanes, other air and space crafts, and their component parts from exposure to environmental conditions (e.g., sun, rain, wind, snow, ice, heat, cold, soil, environmental contaminants, harmful gases, chemical exposure, and the like). These coatings may also be selected and applied for aesthetic reasons. The modern aerospace industry increasingly uses advanced materials such as composites that are lighter in weight and/or are stronger than traditional materials such as steel, stainless steel, and aluminum. It has been known that leaving materials and components exposed or untreated (i.e., without any coating) subjects the material to the harmful effects of environmental conditions. Heretofore, it has been commonly believed that applying coatings on underlying materials protected those materials from environmental conditions including blocking the transmission of light through the coatings such that light does not reach the underlying materials. As a result, testing for light transmission through these coatings and the effects of such light transmission has not been performed and cannot be performed with commercial instruments commonly used for light absorbance measurements.

BRIEF SUMMARY

In accordance with one or more examples, a system for evaluating light transmission through coatings is disclosed. The system may include a light source, wherein the light source is to transmit light through a coating sample. A sample holder is in optical communication with the light source, wherein the sample holder is to hold the coating sample in a position to receive the transmitted light. A spectrometer is in optical communication with the light source, wherein the spectrometer is to measure an amount of the transmitted light that passes through the coating sample at each wavelength of the transmitted light. The system further includes an opaque cover to enclose the spectrometer and at least part of the sample holder, wherein the opaque cover is to prevent light other than the transmitted light from entering the spectrometer such that any light transmitted through the coating sample can be accurately evaluated. The light source is to simulate light over a spectrum of light including at least one of ultraviolet-A (UV-A), ultraviolet-B (UV-B), visible and infrared. The system may optionally include one or more optical filters in optical communication with the sample holder, wherein the one or more filters are to condition any transmitted light that passes through the coating sample to reduce the intensity of the light outside of wavelengths of interest. Conditioning the light may include blocking one or more wavelengths of the transmitted light that passes through the coating sample such that the one or more wavelengths of interest can be more quickly collected and efficiently evaluated.

In accordance with one or more other examples, an apparatus for evaluating light transmission through coatings is disclosed. The apparatus includes a sample holder for receiving an amount of light, wherein the sample holder is to hold a coating sample in a position to receive the light. A spectrometer is in optical communication with the sample holder, wherein the spectrometer is to measure an amount of the light that passes through the coating sample at each wavelength of the light. The apparatus also includes an opaque cover to enclose the spectrometer and at least part of the sample holder, wherein the opaque cover is to prevent extraneous light from entering the spectrometer such that any light that passes through the coating sample can be accurately evaluated. The apparatus may further includes a light source, wherein the light source is to transmit light through the coating sample, and wherein the light source is to simulate a spectrum of light including at least one of ultraviolet-A (UV-A), ultraviolet-B (UV-B), visible and infrared. The apparatus may optionally include one or more optical filters in communication with the sample holder, wherein the one or more optical filters are to condition any light that passes through the coating sample to reduce the intensity of the light outside of wavelengths of interest. Conditioning the light may include blocking one or more wavelengths of the light that passes through the coating sample such that the one or more wavelengths of interest can be more quickly collected and efficiently evaluated.

In accordance with one or more examples, a method for evaluating light transmission through coatings is disclosed. The method includes transmitting, via a light source, light through a coating sample; holding, via a sample holder in communication with the light source, the coating sample in a position to receive the transmitted light; measuring, via a spectrometer in communication with the light source, an amount of the transmitted light that passes through the coating sample at each wavelength of the transmitted light; and enclosing, via an opaque cover, the spectrometer and at least part of the sample holder, to prevent light other than transmitted light from the light source from entering the spectrometer such that any transmitted light passing through the coating sample can be accurately evaluated. The method further includes the light source is to simulate a spectrum of light including at least one of ultraviolet-B (UV-B), ultraviolet-A (UV-A), visible and infrared light. The method may optionally include conditioning, via one or more optical filters in communication with the sample holder, any light that passes through the coating sample into different wavelengths of interest. Conditioning the transmitted light may include blocking one or more wavelengths of the transmitted light that passes through the coating sample such that the one or more wavelengths of interest can be more quickly collected and efficiently evaluated.

Accordingly, examples of the system, apparatus, and method for evaluating light transmission through coatings disclosed herein provide the ability to rapidly measure and generate detailed readings related to the amount of light transmitted through coatings at each wavelength. The system, apparatus, and method provides the ability to perform a range of diagnostic tests including, for example, diagnosing current paint systems, screening candidate paint systems, testing the effects of coating systems, and the like. As a result, the most effective paint systems may be reliably identified and used for a given application. Consequently, in many instances the life of very expensive and critical components may be extended, and maintenance and repair costs may be reduced.

The features, functions, and advantages that have been discussed may be achieved independently in various examples or may be combined in yet other examples further details of which can be seen with reference to the following description and drawings.

DRAWINGS

The various advantages of the examples of the present disclosure will become apparent to one skilled in the art by reading the following specification and appended claims, and by referencing the following drawings, in which:

FIG. 1 shows a system 100 for evaluating light transmission through coatings according to an example.

FIG. 2A-H show various views of portions of an apparatus for evaluating light transmission through coatings according to one or more examples.

DESCRIPTION

Figure 1:
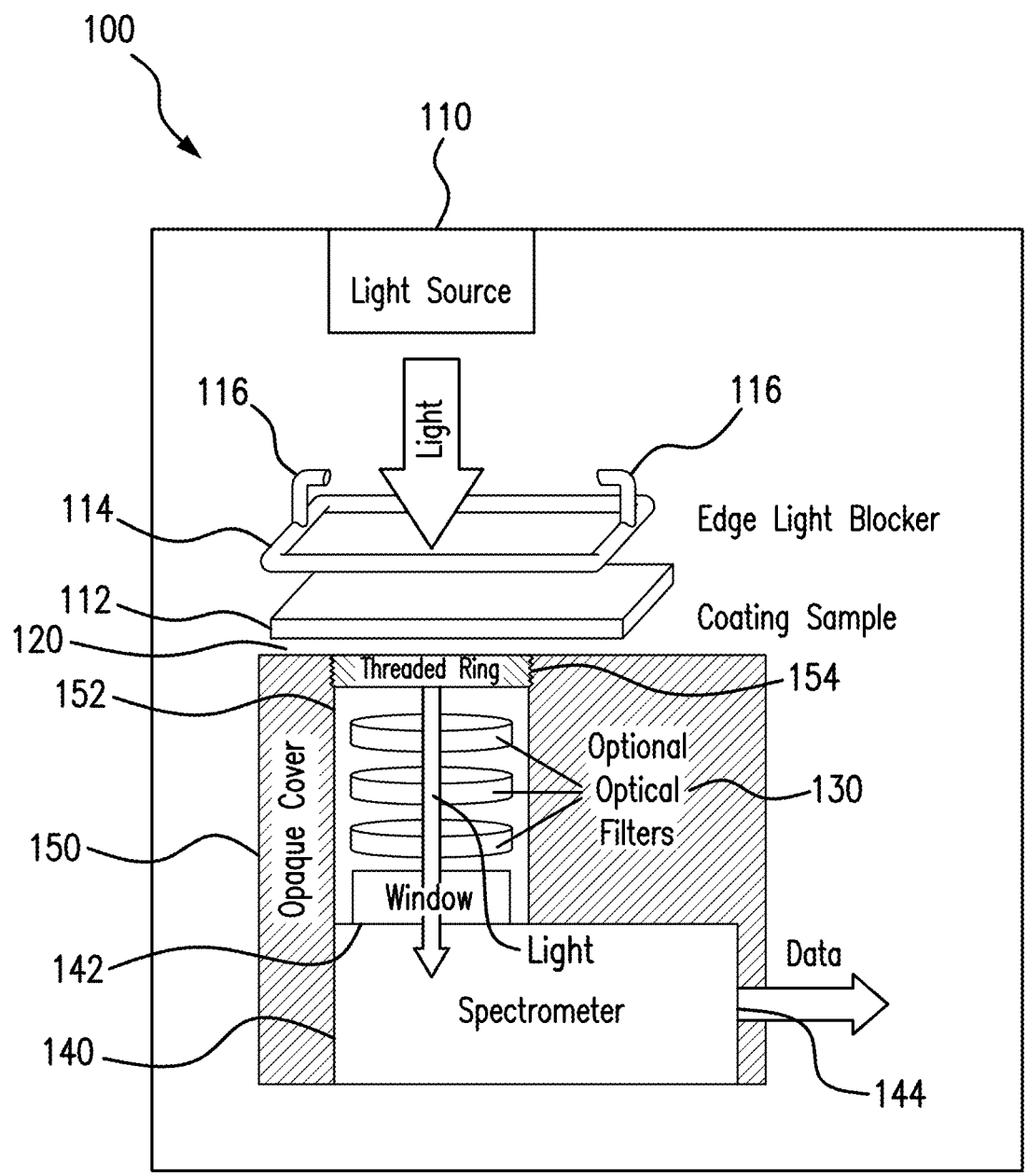

Turning now to FIG. 1, in accordance with one or more examples, a system 100 for evaluating light transmission through coatings is shown. In at least one example, the system 100 includes a light source 110, a sample holder 120, a spectrometer 140, and an opaque cover 150. The light source 110 is to transmit high intensity light (e.g., simulated sunlight) through a coating sample 112. In one or more embodiments, the light source 110 is to simulate a spectrum of light including at least one of ultraviolet-A (UV-A), ultraviolet-B (UV-B), visible and infrared bands of light. In various embodiments, the light source 110 is selected to produce light sufficient to simulate light for the intended function of the coating sample 112. In at least some embodiments, the light source 110 should transmit light of sufficient intensity to allow light to pass through the coating sample 112 and arrive at the spectrometer 140 above the limit of detection for the spectrometer 140 such that the light may be detected and quantified by wavelength. In at least some examples, the light source 110 may be a chamber and the sample holder 120, the optional one or more optical filters 130, spectrometer 140, and opaque cover 150 are to be placed inside the light source chamber. The coating sample 112 may be, for example, one or more of a primer, a base coat, a top coat, and the like. The coating sample 112 is applied to a slide that is transparent to at least the range(s) of light to be investigated and measured. In at least some embodiments, quartz or glass slides may be suitable for use as the slide to which the coating sample is applied. Quartz slides (e.g., coated synthetic fused silica), for instance, are transparent to UV light and are suitable for use in UV applications. Glass slides, on the other hand, are transparent to wavelengths above 185 nm and are suitable for use when investigating and measuring wavelengths of light above 185 nm. The coating sample 112 may be applied on the slide, for example, as a thin film of a desired thickness (e.g., 0.5 mils to 3.0 mils). A sample holder 120 is in optical communication with the light source 110 and holds the coating sample 112 in a position to receive and be saturated by the light transmitted from the light source 110. As already discussed, the light should be of sufficient intensity to pass through the coating sample 112. The coating sample 112 may be, for example, a layer of paint, primer, thin film, surfacing film, laminate, peel ply, and the like that is to be measured and analyzed. The coating sample 112 should be substantially uniform in thickness across the slide such that any light passing through the coating sample 112 can be uniformly measured. Multiple coating samples 112 having layers of various thicknesses may be used to investigate the effect(s) of layer thickness on light transmission levels to better determine coating effectiveness.

A spectrometer 140 is in optical communication with the light source 110 and the coating sample 112 such that the spectrometer 140 measures an amount(s) (e.g., intensities and wavelengths) of the light transmitted from the light source 110 that passes through the coating sample 112. The spectrometer 140 includes a window (or aperture) 142 in optical communication with the optional one or more optical filters 130 and/or the coating sample 112 to receive the transmitted light. The window 142 may include optical diffusers (e.g., cosine correctors) that may be formed, for example, of opaline glass, PTFE or Spectralon® (developed by Labsphere, Inc.). In at least some examples, the window 142 may couple to fibers (not shown) and/or the spectrometer 140 to collect a signal within a field of view (e.g., 180°). In at least some embodiments, the system 100 may also optionally include one or more optical filters 130 in optical communication with the sample holder 120 to condition any transmitted light that passes through the coating sample 112 in order to reduce the intensity of light outside of one or more wavelengths of interest (e.g., Ultraviolet-A (UV-A), Ultraviolet-B (UV-B), visible, and infrared, etc). In at least some applications, for example, when the light is relatively high intensity and transmission through the coating sample 112, the optional one or more filters 130 may be helpful or necessary to achieve sufficient sensitivity (i.e., signal to noise ratio) in the wavelength range(s) of interest. Similarly, in applications or situations where the light source 110 is relatively weak (i.e., low intensity and/or low transmission through the coating sample 112) or when the coating sample 112 has a high absorbance and/or reflectance of light, it may not be advantageous or desirable to use the optional one or more filters 130 due to a resulting insufficient signal to noise ratio.

In at least some examples, the spectrometer 140 outputs the measured light data via a data line 144 for analysis. The opaque cover 150 encloses the spectrometer 140, the optional one or more optical filters 130, and at least part of the sample holder 120. The opaque cover 150 is formed of one or more materials that are impervious to light. The opaque cover 150 blocks and prevents light other than transmitted light from the light source 110 from entering the spectrometer 140. As a result, any transmitted light that passes through the coating sample 112 may be accurately measured and analyzed. As an example, the intensity of the detected light passing through the coating sample 112 may be measure and analyzed at each transmitted wavelength.

In at least some examples, the sample holder 120 may form at least a part of the opaque cover 150 (e.g., a part of the top portion). The opaque cover 150 also includes an optical column 152 that fittingly holds the optional one or more optical filters 130 in place and aligns the optical components (i.e., the light source 110, the coating sample 112, the optional one or more optical filters 130, and the window 142 of the spectrometer 140). The opaque cover 150 may also include a threaded ring 154 that helps to fittingly hold the optional one or more optical filters 130 in place and provide access to the optical column 152. The opaque cover may also be three-dimensionally (3-D) printed to tightly fit the coating sample 112, the optional one or more optical filters 130, and the window 142 of the spectrometer 140) to cover any holes, voids, vents, fasteners, power inputs, data lines, data interfaces, etc. such that extraneous light (i.e., light not transmitted by the light source 110) is prevented from entering the spectrometer 140. The system 100 may also include an edge light blocker 114 disposed on top of the sample holder to prevent any stray light from passing to the spectrometer around an edge of the sample holder 120. The edge light blocker 114 may include one or more tabs 116 that allow enable the insertion and removal of the edge light blocker 114 without touching the coating sample 112 to avoid potential negative impacts on measurements due to touching the coating sample 112. Because the light source 110 is high intensity light source, the "light tight" construction of the opaque cover 150 provides an essential feature for providing accurate light transmission readings. By making the system effectively "light tight", the detection sensitivity of the spectrometer 140 is substantially improved.

In at least some examples, the light source 110 is capable of producing high intensity light and transmitting the light onto the coating sample 112. The light source 110 may include, for example, a Xenon arc lamp that emits simulated light over a spectrum of light ranges including Ultraviolet-A (UV-A), Ultraviolet-B (UV-B), visible, and infrared. The emitted light from the light source 110 must be bright enough to penetrate and be transmitted through the coating sample 112. Non-limiting examples of suitable light sources are the Weather-Ometer® Ci-3000 and Ci-4000 accelerated weathering chambers made by Atlas Material Testing Solutions of Mount Prospect, Illinois USA. The Right Light™ optical filters (as produced by Atlas Material Testing Solutions) may provide non-limiting examples of suitable filters for producing simulated light in Xenon arc lamps such as the Weather-Ometer® line of lamps. The optional one or more optical filters 130 may be round (e.g., 1 inch diameter "short pass") optical cut-off filters (e.g., 450 nm, 600 nm, and 750 nm, etc.) that reduce or block the intensity of the simulated light that is outside of the region of interest including, for example, UV-A (320-400 nm), violet (400-450 nm), blue (450-480 nm) and the like. The optional one or more optical filters 130 may also be round (e.g., 1inch diameter) optical density filters (e.g., 1.0, 2.0, and 3.0) used to increase or decrease the light throughput to ensure that the transmitted light is within the linear dynamic range of the spectrometer 140. In one or more examples, the one or more optical filters 130 are to filter or block one or more ranges of wavelengths of the transmitted light that passes through the coating sample 112 thereby allowing the transmitted light to be more quickly collected and efficiently evaluated. In one or more examples, the spectrometer 140 should have relatively high sensitivity in order to detect and measure the light that passes through the coating sample 112. In at least some embodiments, these can be very low levels of light transmission (e.g., approximately in the range of 0.1 percent (0.1%) to 0.01 percent (0.01%)). In one or more examples, the spectrometer also offers fast response times (e.g., approximately 50-500 milliseconds), a range of wavelength selectivity (e.g., at least approximately 220 nm to 870 nm), and spectrum software that enables analysis of the full range of transmitted light. A non-limiting example of a suitable spectrometer is the Ocean Optics USB2000+RAD made by Ocean Insight of Orlando, Florida USA. The detected light transmission data may be output to a PC running spectroscopy software, e.g., SpectraSuite® or Ocean View 2.0 software offered by Ocean Insight, for a full analysis of the data.

Figure 2A:
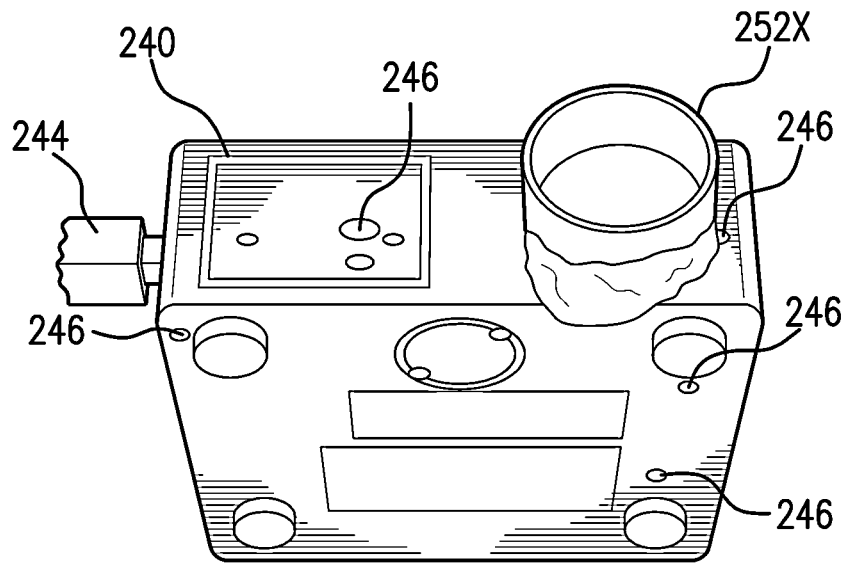
Figure 2B:
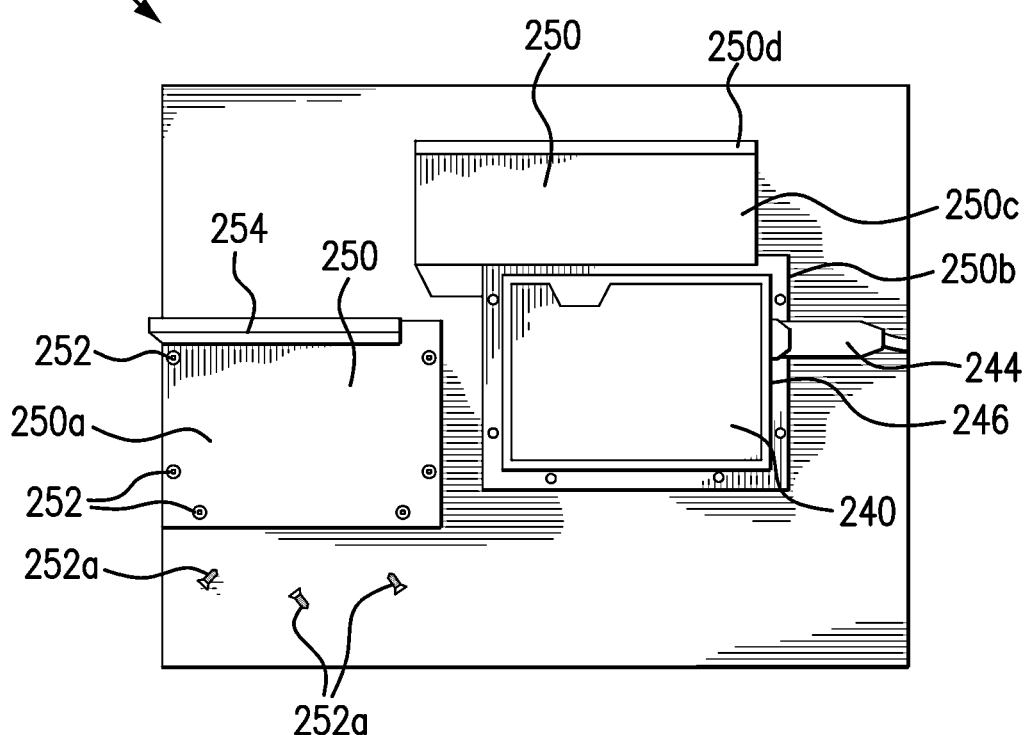
Figure 2C:
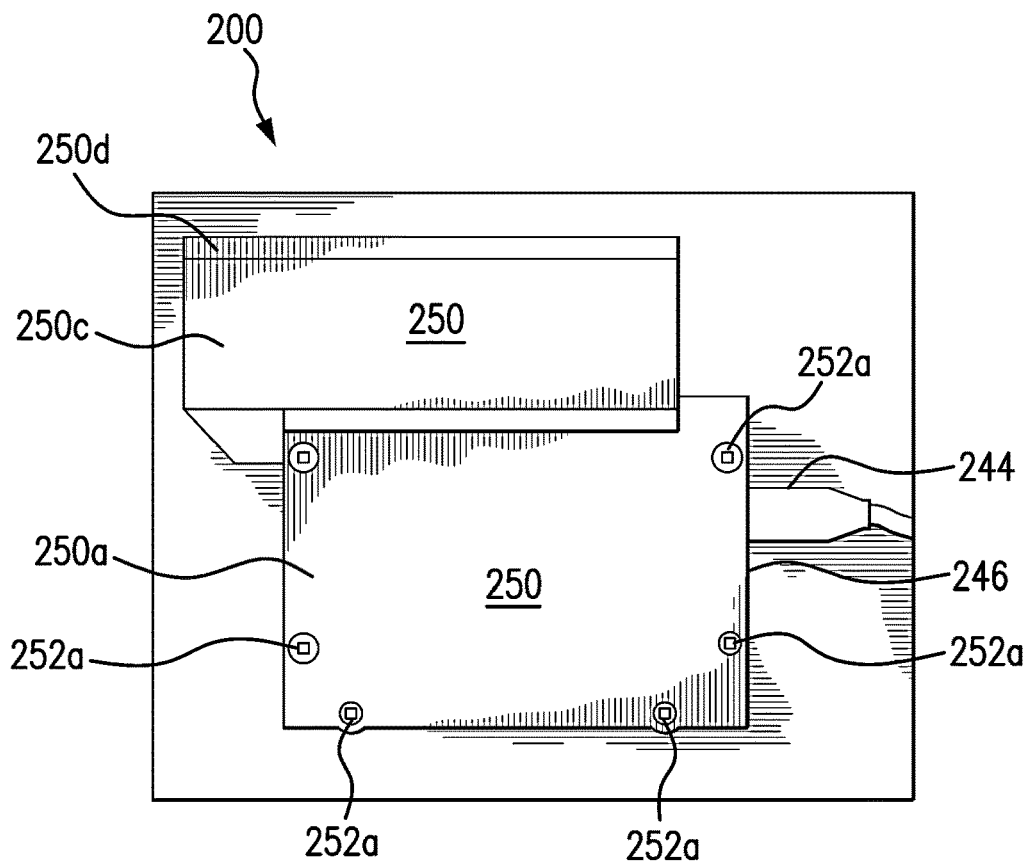

FIGS. 2A-H show, in accordance with one or more examples, multiple views of an apparatus 200 for evaluating light transmission through coatings. As shown in FIGS. 2A-H, the apparatus 200 may be substantially similar to components of system 100 depicted in FIG. 1. In at least one example, as shown in FIGS. 2A-B, an apparatus for evaluating light transmission through coatings is shown. The apparatus 200 includes at least a spectrometer 240 and an opaque cover 250. The spectrometer 240 and the opaque cover 250 may be substantially similar to the spectrometer 140 and the opaque cover 150, as discussed above with respect to FIG. 1. The apparatus 200 also includes a sample holder 250$d$ and optical column 252$x$ for receiving an amount of light, wherein the sample holder 250$d$ is to hold a coating sample (e.g., coating sample 112) in a position to receive the light from a light source (e.g., light source 110). The optical column 252$x$ should also be formed of an opaque or light impervious material. The optical column 252$x$ is to enclose the optional one or more optical filters (e.g., optical filters 130) and fittingly engage the threaded ring (not shown here) (e.g., threaded ring 154). In at least some embodiments, the sample holder 250$d$ may be formed by at least a part of the opaque cover 250. The spectrometer 240 is in optical communication with the sample holder 250$d$, wherein the spectrometer 240 is to measure an amount(s) (e.g., intensities and wavelengths) of the light that passes through the coating sample. The spectrometer 240 may have one or more input/output lines 244 (e.g., power lines, data lines, and the like) and one or more openings 246 (e.g., holes, voids, vents, fasteners, attachment structures, power input opening, data line openings, data interfaces, and the like). The opaque cover 250 encloses the spectrometer, one or more optical filters (optional), and at least part of the sample holder 250$d$, wherein the opaque cover 250 is to prevent extraneous light from entering the spectrometer 240 such that any light passing through the coating sample can be accurately evaluated. The opaque cover 250 may be formed by one or more part or panels 250$a$-$d$. The one or more parts 250$a$-$d$ may include attachment structures such as fittings or screw holes 252 to mate the parts 250$a$-$d$ together using attachment fittings such as screws 252$a$. The panels 250$a$-$d$ may include one or more tabs or fitting structures 254 that mate and tightly fit the panels 250$a$-$d$ together in a lock-and-key manner to sealing, block and prevent extraneous light from entering the opaque cover 250. As shown in FIGS. 2C, when each of the one or more parts 250$a$-$d$ of the opaque cover 250 are attached, the spectrometer 240 is enclosed inside the opaque cover 250 in a "light tight" manner including all openings 246.

Figure 2D:
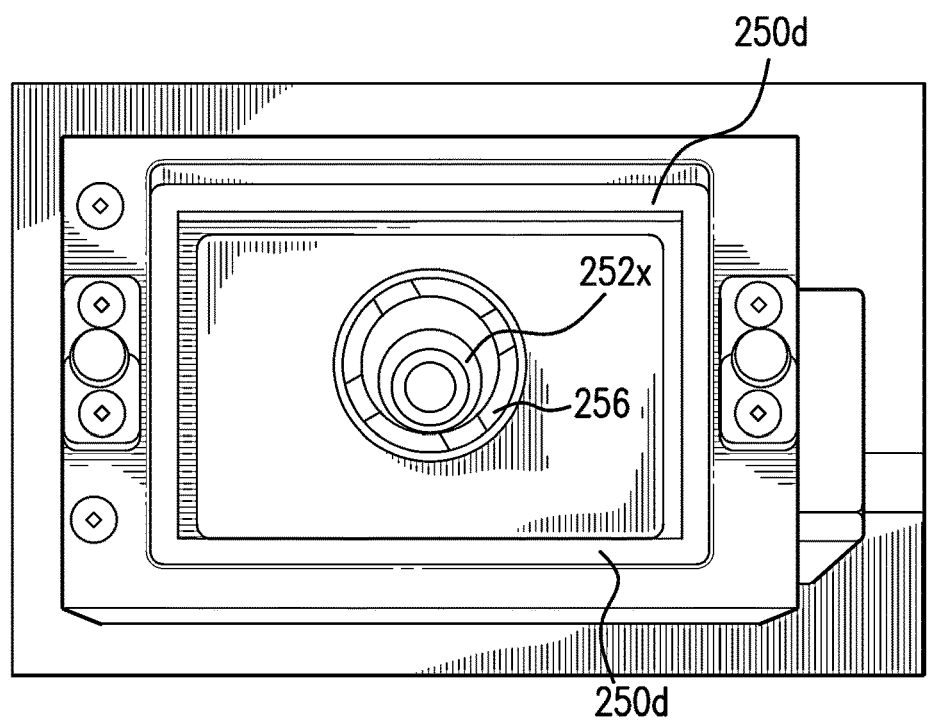
Figure 2E:
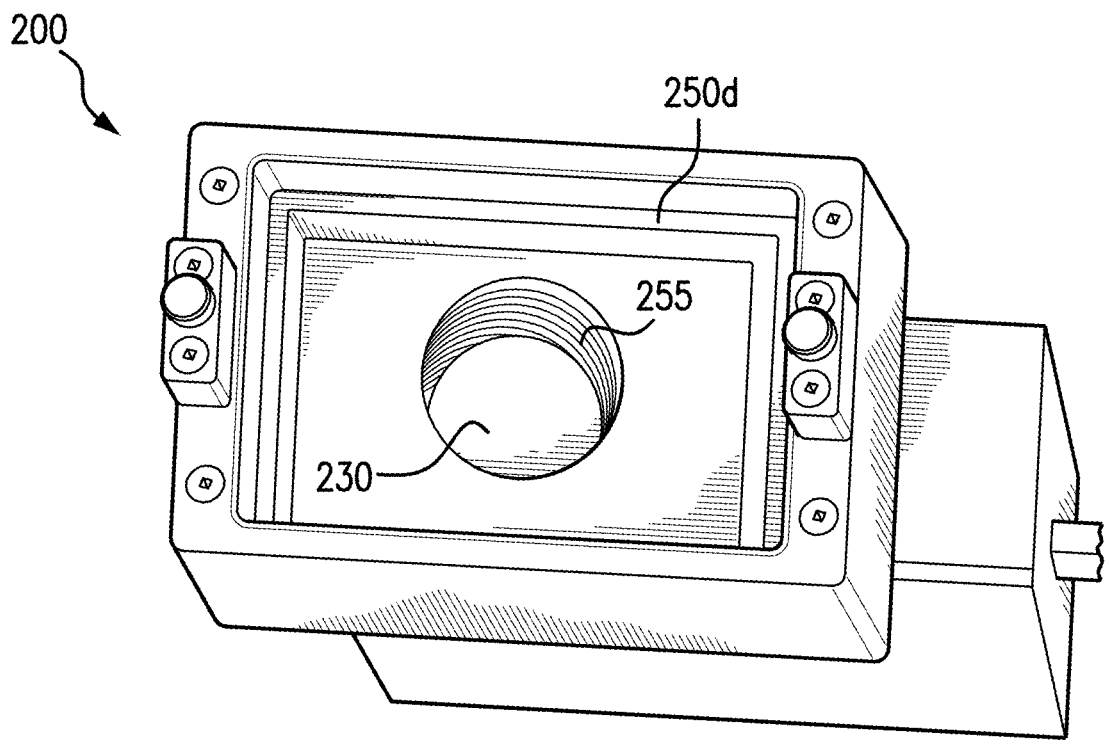
Figure 2F:
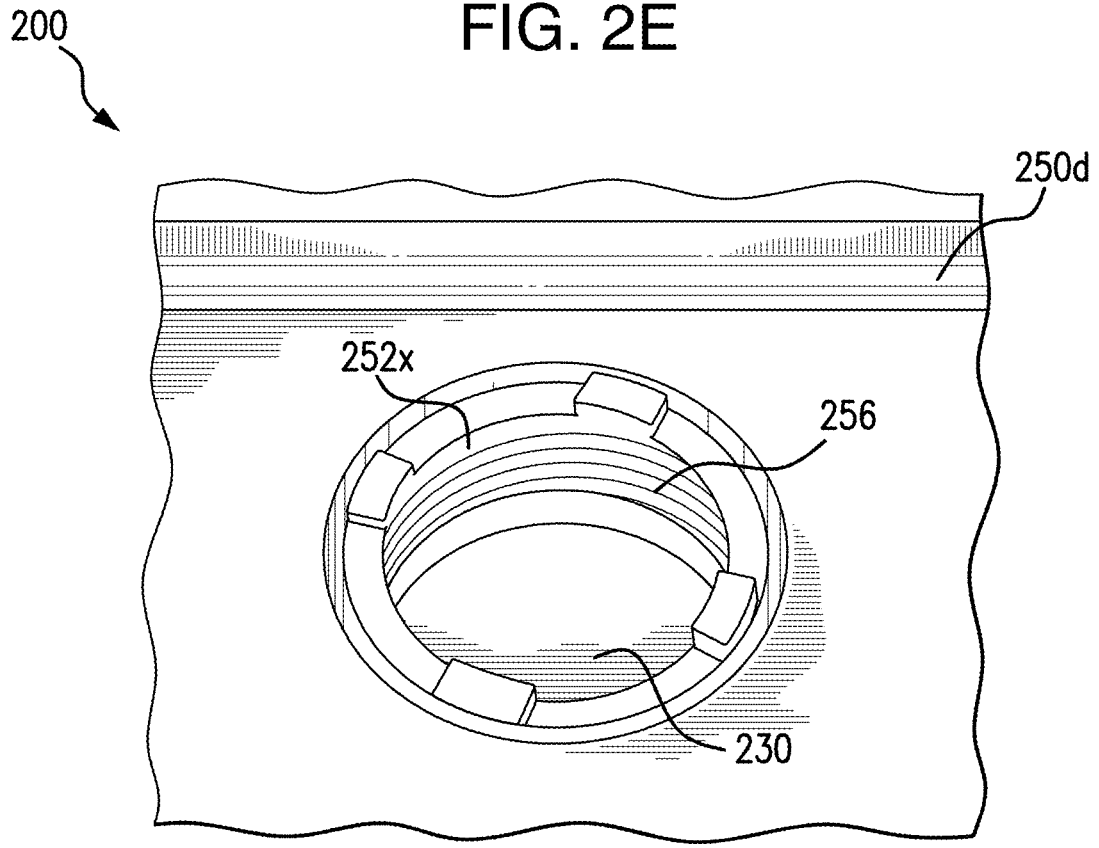
Figure 2G:
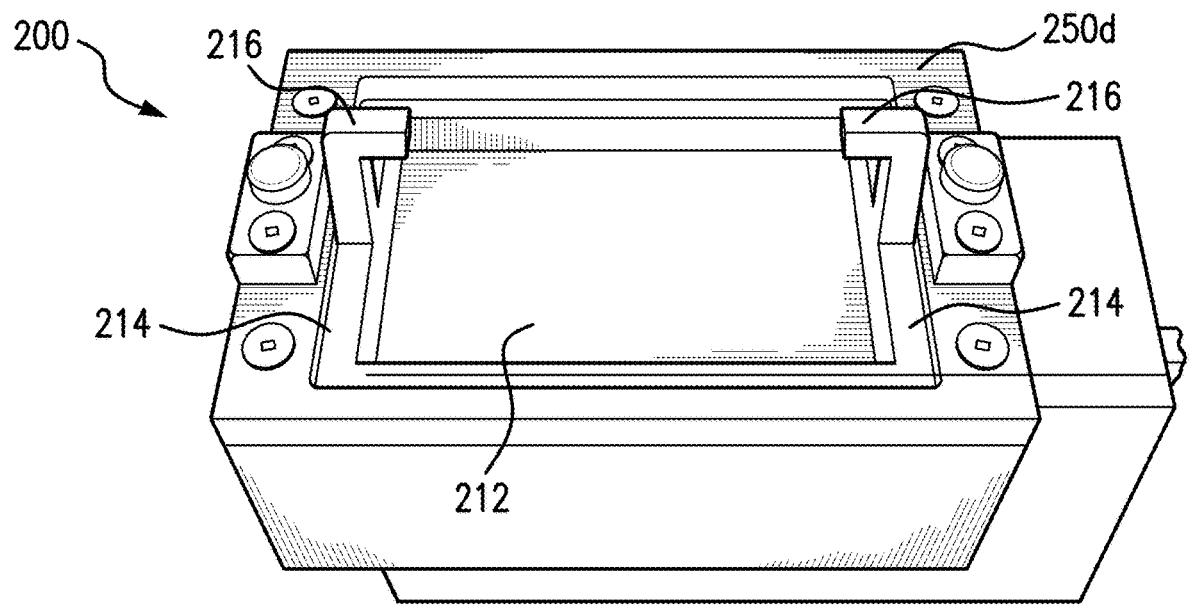

FIGS. 2D-H show various views of a top portion of apparatus 200 including sample holder 250$d$, optical column 252$x$, and threaded ring 256. FIG. 2D shows a top portion of apparatus 200 including the sample holder 250$d$ and the optical column 252$x$ with the threaded ring 256 in place. In at least some embodiments, the threaded ring 256 may include one or more bumps or teeth that help to support a coating sample 212 (as shown in FIG. 2G). FIG. 2E shows a top portion of the apparatus 200 including the sample holder 250k and the optical column 252x with the threaded ring 256 removed thereby revealing screw threads 255. Removing the threaded ring provides access to the optical column 252x such that the optional one or more optical filters 230 may be inserted into and/or removed from the optical column. The optional one or more optical filters 230 should substantially fittingly engage the optical column 252x such that light passes through and is conditioned by the optional one or more optical filters 230. FIG. 2F shows an inset of FIG. 2E including a portion of the sample holder 250d, the optical column 252x and the threaded ring 256. The threaded ring 256 holds one or more optical filters 230 fittingly inside the optical column such that light passes through and is conditioned by the one or more optical filters 230 before passing to the spectrometer 240.

Figure 2H:
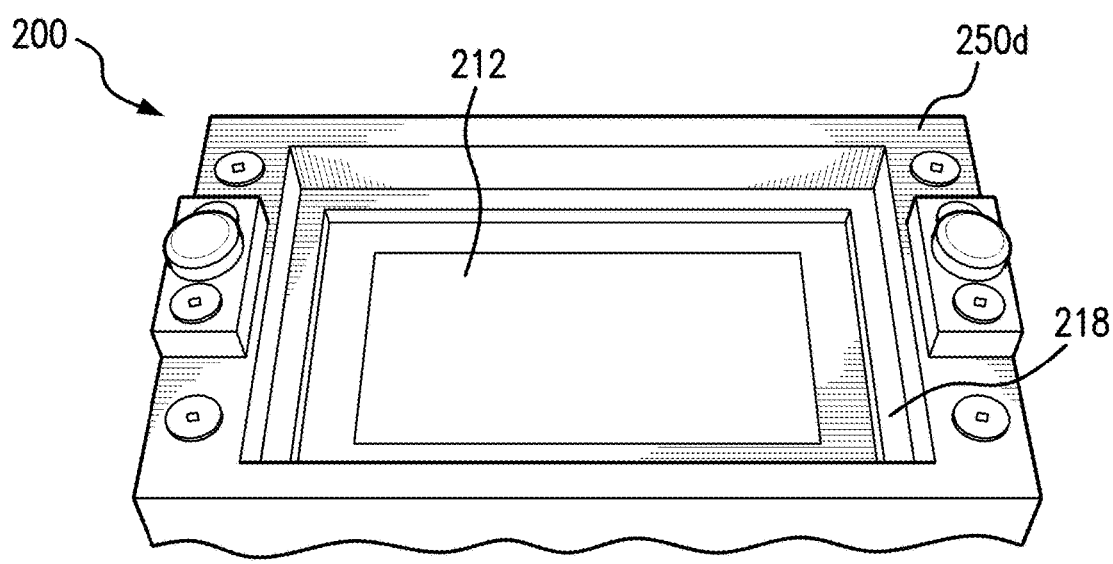

FIG. 2G, according to at least on example, shows a top portion of the apparatus 200 including a sample holder 250d, and an edge blocker 214 with tabs 216. The sample holder 250d supports a coating sample 212 in fitting engagement with the optical column 252x (not shown here). Allowing light to pass around the coating sample and enter into the optical column would lead to inaccurate readings with respect to light transmission through the coating sample 212. The edge blocker 214 sits atop the coating sample 212 and blocks any extraneous light from passing around the coating sample 212 and entering into the optical column 252x. The edge blocker 214 thereby makes the apparatus 200 more "light tight" and thereby improves the accuracy of the apparatus 200. FIG. 2H, according to at least on example, shows a top portion of the apparatus 200 including a sample holder 250d, a coating sample 212, and light impervious tape 218. The light impervious tape 218 is placed along the edges of the top of the coating sample 212. The edge blocker 214 (not shown here) is place on top of the coating sample 212. The light impervious tape 218 provides an additional layer of light blocking to further improve the light blocking features of the apparatus 200 thereby leading to improved accuracy related to light transmission measurements.

As a result of the use of high intensity light source and improved detection sensitivities due, at least in part, to the apparatus 200 being sealed from extraneous light, the apparatus 200 is capable of measuring extremely low levels of transmitted light including transmission levels in the range of range of 0.1 percent (0.1%) to 0.01 percent (0.01%). Measuring such low levels of transmitted light were not previously possible or deemed necessary. Previous light transmission levels were typically measured at zero percent (0%). However, the zero percent light transmission is now known to have been due to limitations in detection sensitivity. Further, due to these previously unknown limitations it was commonly believed that applying coatings on substrates—including the coatings and substrates used in the aerospace industry—blocked light and any detrimental effects that may be associated with the light. Coatings have typically been applied to address damage related to corrosion, wind, chemicals (e.g., deicer), and the like, but not to address damage caused by light. As a result, the effects of transmitted light on coatings used in the aerospace industry (including commercial aircraft) such as paints, primers, thin films, surfacing films, laminates and the like were largely unknown. Further still, the effects of "weathering" on coating systems have typically been examined in an ad hoc fashion (e.g., visual detection of degradation or damage) over long periods of time (e.g., in 6 month to 1 year increments). As a result of the improved light transmission provided by system 100, more is now known about the effects and damage caused by light (e.g., sunlight) on these coating systems and the associated exposure of the underlying parts and components to damage. For example, due to the detection capabilities provided by system 100 it is now known that all bands of light, even at very low transmission levels, can be damaging to coatings and underlying materials over time. Composite materials may be particularly prone to damage. For example, coating systems may be used to protect the outer surfaces of airplanes from environmental conditions. However, damage to the underlying structure (i.e., the skin of the airplane) may result when the wrong wavelengths of light penetrate through the coating system. Depending on which surface(s) of the coating system is compromised, the deleterious effects of the light may lead to corrosion and ultimately effect control surfaces and structural components. The system 100 allows coating systems to be quickly and extensively analyzed, to provide light transmission levels including which, if any, bands (i.e., wavelengths) of light are being blocked by particular coatings in specific thicknesses. Given the substantial expense and critical nature of the equipment that the coating systems protect, it is important to both test existing coatings for dependability and examine prospective coatings to identify candidates for future use. The system 100 allows the characteristics of coatings and coating systems to be finely tuned for specific applications in order to prevent damage and prolong the life of the coating system and the underlying material. Further, due to the detection sensitivity provided by spectrometer 140, the system 100 must be completely light sealed by an opaque cover 150 (e.g., an opaque 3D printed cover) to prevent extraneous light from entering the system and leading to incorrect readings. As a result of the high intensity light, the powerful detection sensitivity and light sealed cover, the system 100 is capable of making accurate measurements that are orders of magnitude faster than would otherwise be possible. The system 100 thereby enormously improves time savings when compared to other testing alternatives.

Figure 3:
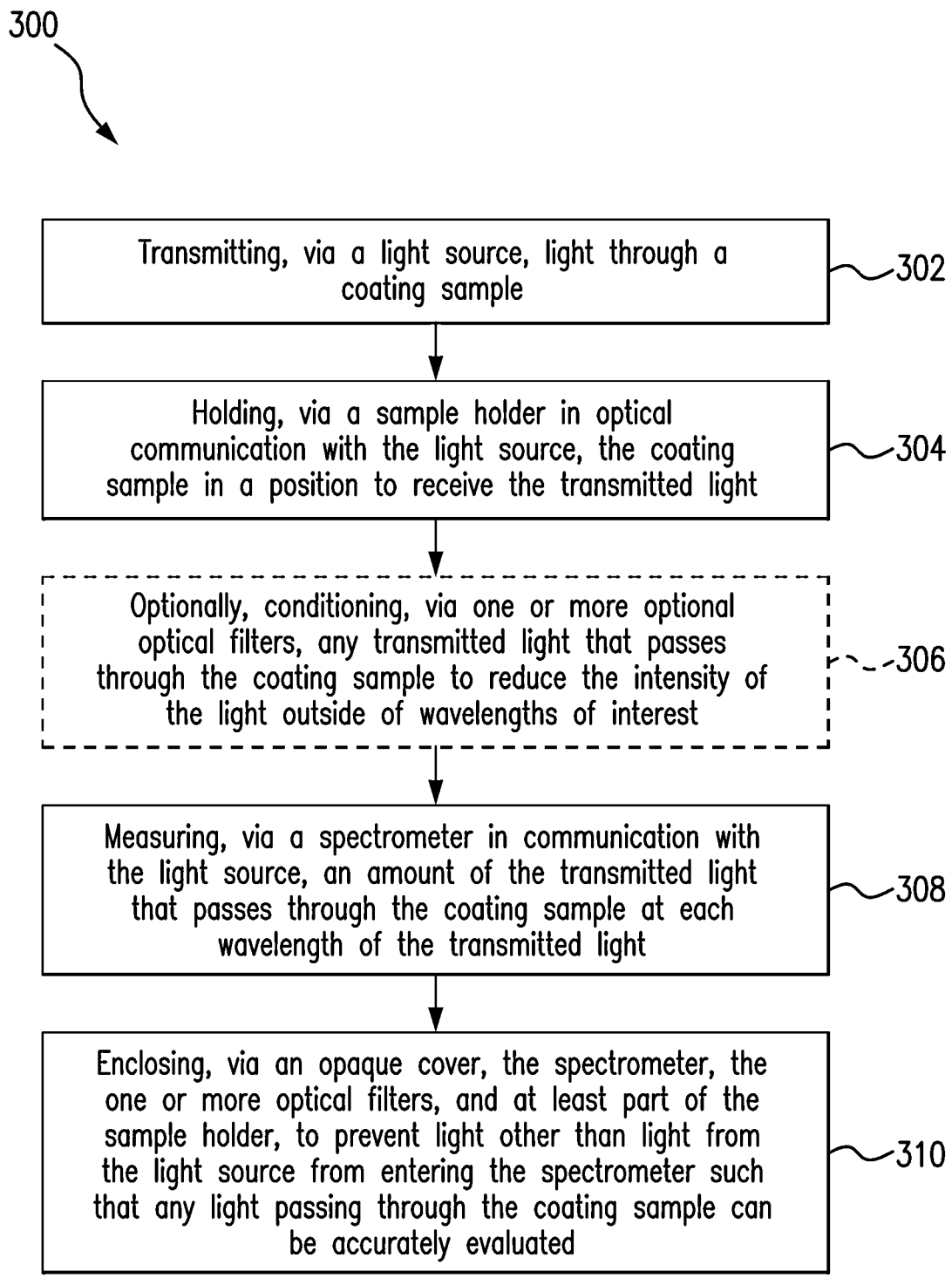
FIG. 3 shows a method for evaluating light transmission through coatings according to examples as shown in FIGS. 1 and 2A-H.

FIG. 3 shows a method 300 for evaluating light transmission through coatings. The method 300 can be implemented in a system or apparatus such as, for example, the system 100 shown in FIGS. 1-2. In examples, the aspects of the method 300 can be implemented in logic instructions (e.g., software), configurable logic, fixed-functionality hardware logic, etc., or any combination thereof. Aspects of the method 300 can also be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 300 can be written in any combination of one or more programming languages, including an object oriented programming language such as JAVA, SMALLTALK, C++ or the like and conventional procedural programming languages, such as the "C" programming language or similar programming languages.

Additionally, logic instructions might include assembler instructions, instruction set architecture (ISA) instructions, machine instructions, machine dependent instructions, microcode, statesetting data, configuration data for integrated circuitry, state information that personalizes electronic circuitry and/or other structural components that are native to hardware (e.g., host processor, central processing unit/CPU, microcontroller, etc.).

The illustrated method 300, at block 302 includes transmitting, via a light source, light through a coating sample. The light source may be, for example, substantially similar to light source 110 and the coating sample may be substantially similar to coating sample 112. The method 300, at block 304, includes holding, via a sample holder in optical communication with the light source, the coating sample in a position to receive the transmitted light. The sample holder may be substantially similar to sample holder 120. The method, at block 306, may optionally include conditioning, via one or more optional optical filters, any transmitted light that passes through the coating sample to reduce the intensity of the light outside of wavelengths of interest. The optional one or more optical filters may be substantially similar to one or more optical filters 130. The method 300, at block 308, includes measuring, via a spectrometer in communication with the light source, an amount of the transmitted light that passes through the coating sample at each wavelength of the transmitted light. The spectrometer may be substantially similar to spectrometer 140. The method 300, at block 310, includes enclosing, via an opaque cover, the spectrometer, the optional one or more optical filters, and at least part of the sample holder, to prevent light other than light from the light source from entering the spectrometer such that any transmitted light passing through the coating sample can be accurately evaluated. The opaque cover may be substantially similar to opaque cover 150.

Figure 4:
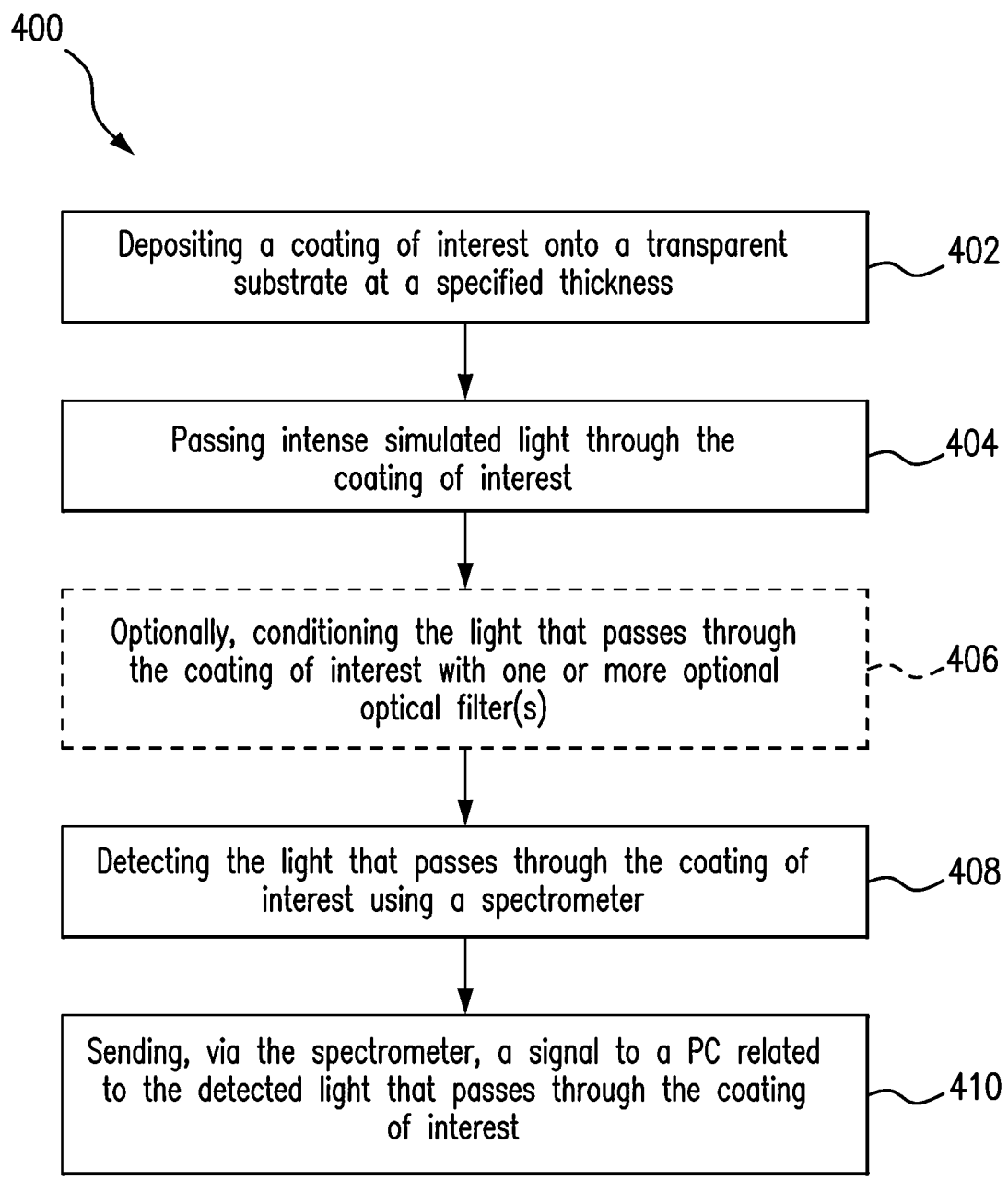
FIG. 4 shows a method for evaluating light transmission through coatings according to examples as shown in FIGS. 1, 2A-H and 3.

FIG. 4 shows a method 400 for evaluating light transmission through coatings. The method 400 can be implemented in a system or apparatus such as, for example, the system 100 shown in FIGS. 1-2. In examples, the aspects of the method 400 can be implemented in logic instructions (e.g., software), configurable logic, fixed-functionality hardware logic, etc., or any combination thereof. Aspects of the method 400 can also be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 400 can be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, statesetting data, configuration data for integrated circuitry, state information that personalizes electronic circuitry and/or other structural components that are native to hardware (e.g., host processor, central processing unit/CPU, microcontroller, etc.).

The method 400, at block 402, includes depositing a coating of interest onto a transparent substrate at a specified thickness. The coating of interest may be substantially similar to coating sample 112 and the transparent substrate may be substantially similar to the quartz slide discussed above. The coating of interest may be applied to the transparent substrate as a thin film in varied thicknesses in order to identify a best fit for a particular application. The method 400, at block 404 includes passing intense simulated light through the coating of interest. The intense simulated light may be generated, for example, by a light source that is substantially similar to light source 110. As discussed above, the simulated light should be of sufficient intensity to penetrate and pass through the coating sample 112 such that the light that passes through the coating sample 112 can be measured via the spectrometer 140. The method 400, optionally at block 406, includes conditioning the light that passes through the coating of interest with one or more optical filter(s). The optical filter(s) may be substantially similar to the one or more optical filters 130. The method 400, at block 408 includes detecting the light that passes though the coating of interest using a spectrometer. The transmitted light may be detecting using a detector that is substantially similar to spectrometer 140. The coating of interest, the optical filter(s), and spectrometer are to be light-sealed inside an opaque cover such that extraneous light is prevented from entering. The opaque cover may be substantially similar to opaque cover 150. The method 400, at block 410 sending, via the spectrometer, a signal to a PC related to the detected light that passed through the coating of interest.

Figure 5:
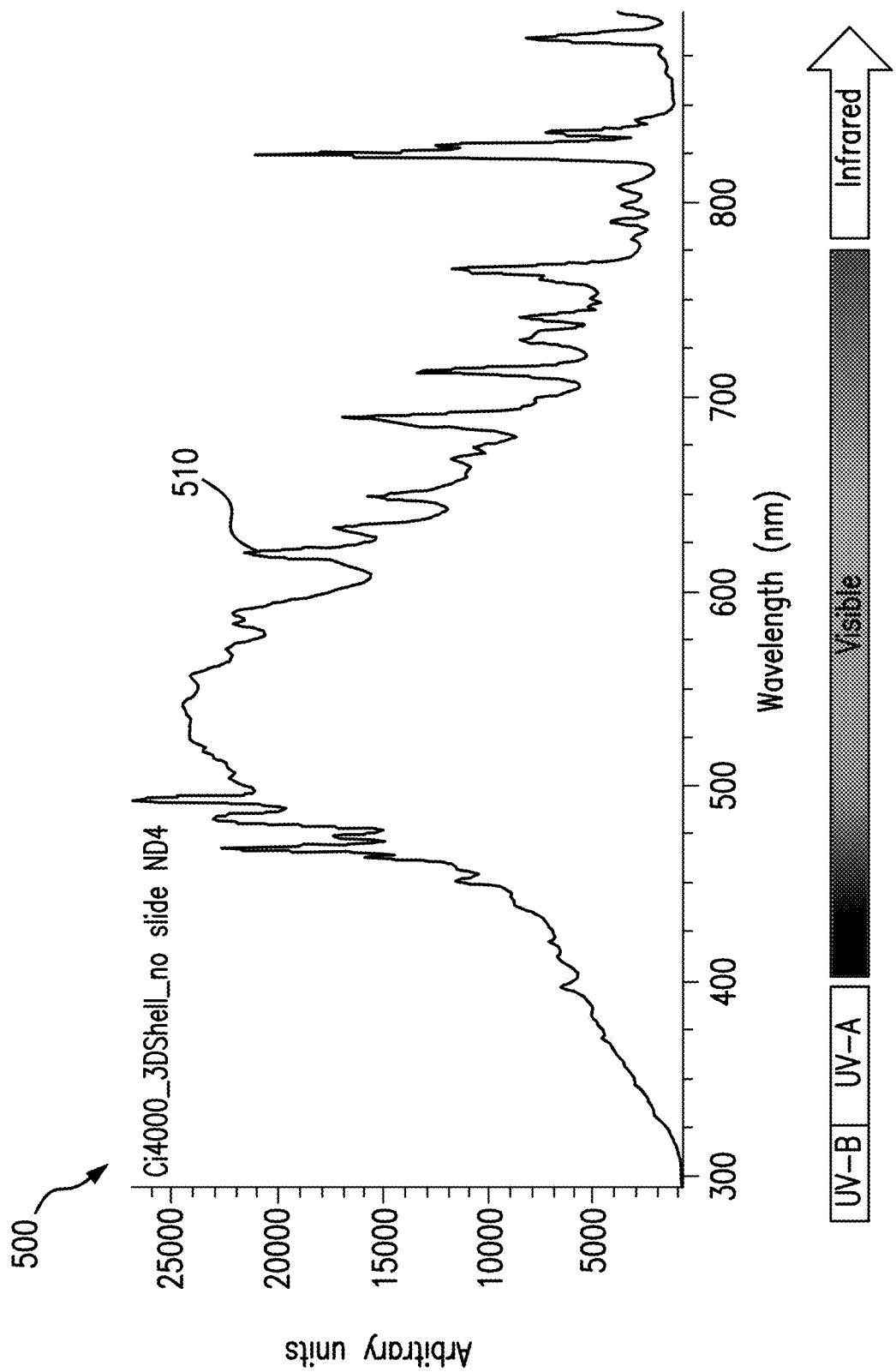
FIG. 5 shows an example of a graph that illustrates a spectrum of simulated direct sunlight.
Figure 6:
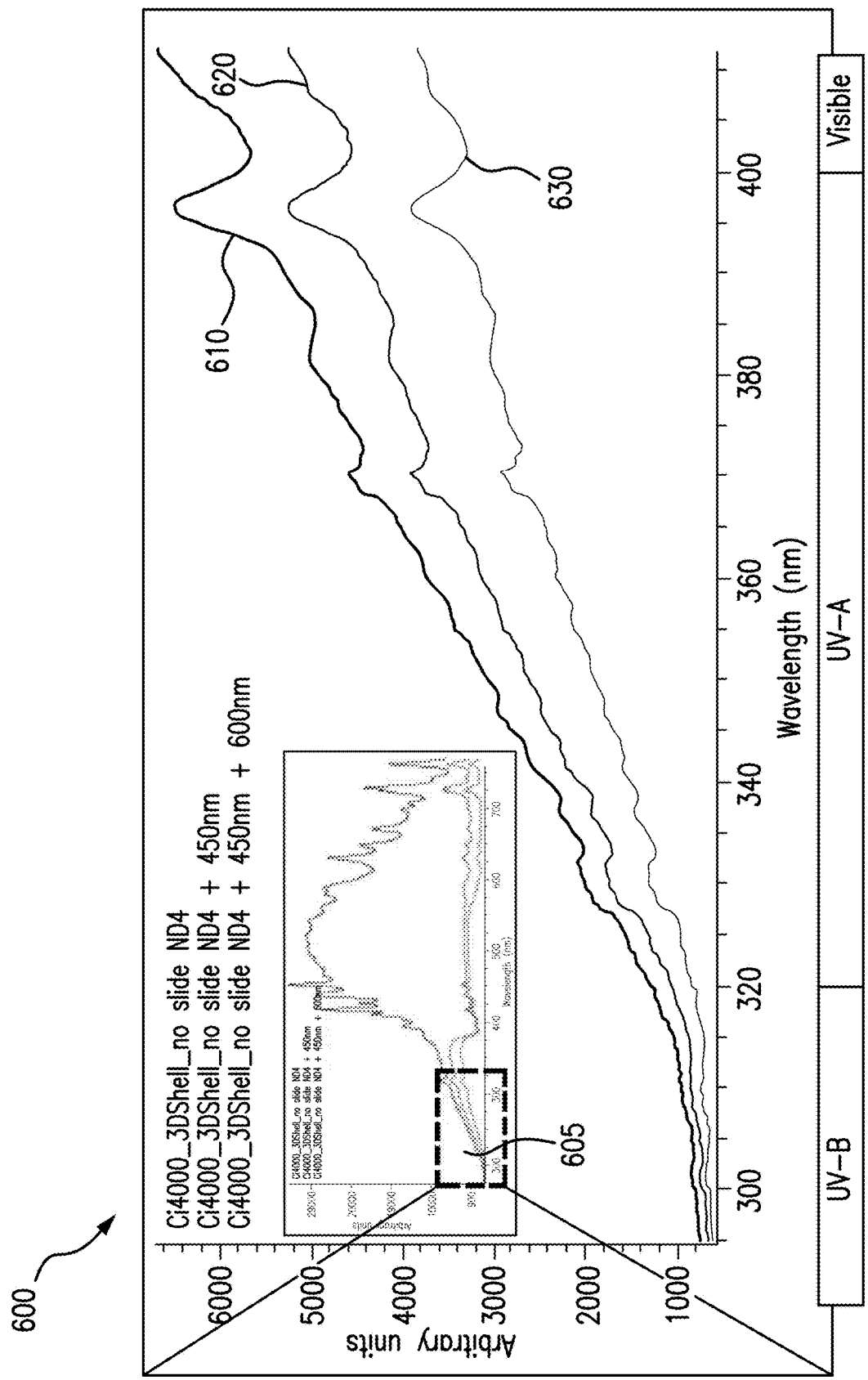
FIG. 6 shows an example of a graph that illustrates the effects of conditioning the simulated direct sunlight.
Figure 7:
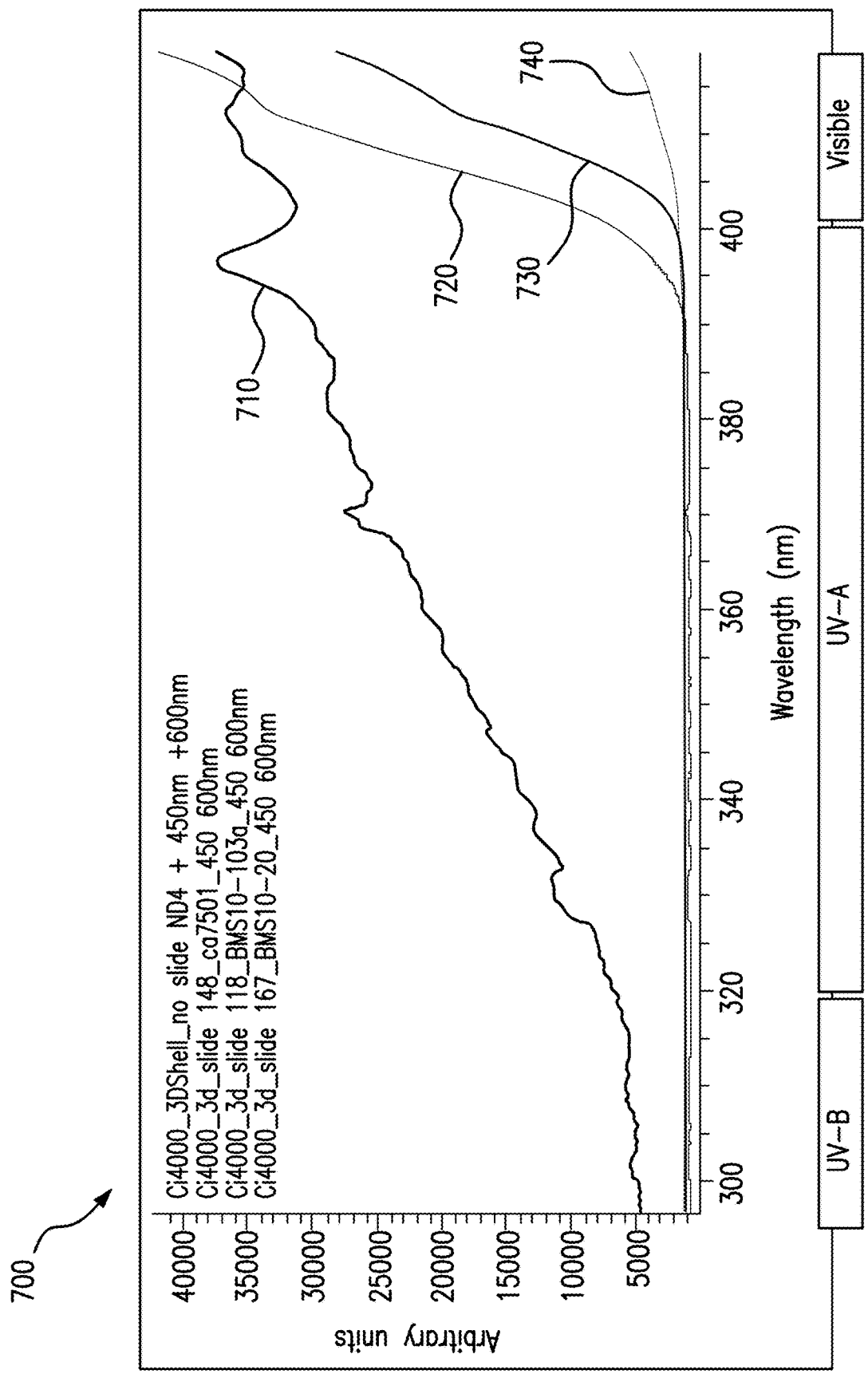
FIG. 7 shows an example of a graph that illustrates the effects of light transmitted through a primer coating sample.

FIGS. 5-7 show examples of graphs that illustrate evaluating light transmission through coatings based on the disclosed system. The graphs illustrate amounts (i.e., intensities and wavelengths) of simulated sunlight generated by a light source, passed through coatings of interest, conditioned by optical filters, and detected by a spectrometer. FIG. 5 shows an example of a graph 500 that illustrates a spectrum of simulated direct sunlight 510. In this example, the simulated direct sunlight 510 is generated by a Weather-Ometer® Ci-4000 accelerated weathering chamber as the light source and no coating sample is used. The simulated direct sunlight 510 is detected by an Ocean Optics USB2000+RAD spectrometer. The spectrometer is protected from stray light by an opaque cover (e.g., a 3D printed cover). The graph 500 shows that a ND4 filter blocked 99.99% of the light from the optical path. The light transmission is similar to the effects of aerospace paint. The spectrometer detected UV-B (280-320 nm), UV-A (320-400 nm), Visible (400-780 nm), and Infrared (>780 nm) light. FIG. 6 shows an example of a graph 600 that illustrates the effects of conditioning the simulated direct sunlight 610 (e.g., simulated direct sunlight 510). Cut-off filters blocked unwanted wavelengths from saturating the spectrometer. The test focused on UV wavelengths (i.e., UV-B and UV-A) which were less intense than visible wavelengths. In this example, 450 nm and 600 nm cut-off filters were used to condition the simulated direct sunlight 610. The inset 605 shows that the 450 nm cut-off filter (with an output shown at 620) and the 600 nm cut-off filter (with an output shown at 630) reduced intensity ~420-870 nm without distorting UV from the light source. FIG. 7 shows an example of a graph 700 that illustrates the effects of light transmitted through a primer coating sample. In this example, three different primer samples (i.e., CA7501, BMS10-103a, and BMS10-20) were deposited onto quartz slides. The top graph line 710 shows the UV spectrum from the light source. The other graph lines 720, 730, 740 show data from the light source shining through the primer samples. The CA7501 primer sample (shown at 720) allowed the most UV-A light to reach the spectrometer. The BMS10-103a primer sample (shown at 730) allowed a small amount of UV-A light to reach the spectrometer. The BMS10-20 primer sample (shown at 740) allowed the least amount of UV-A light to reach the spectrometer. In this example, the opaque cover and cut-off filters blocked unwanted wavelengths of light which allowed the test to focus on how the primers blocked blue and UV wavelengths from passing through the primers and to the surface of an underlying material. As a result, the test is helpful in determining the effectiveness of primer and other samples in blocking light.

ADDITIONAL NOTES AND EXAMPLES

Example 1 includes a system for evaluating light transmission through coatings, the system comprising: a light source, wherein the light source is to transmit light through a coating sample; a sample holder in optical communication with the light source, wherein the sample holder is to hold the coating sample in a position to receive the transmitted light; a spectrometer in optical communication with the light source, wherein the spectrometer is to measure an amount of the transmitted light that passes through the coating sample at each wavelength of the transmitted light; and an opaque cover to enclose the spectrometer and at least part of the sample holder, wherein the opaque cover is to prevent light other than the transmitted light from entering the spectrometer such that any light transmitted through the coating sample can be accurately evaluated.

Example 2 includes the system of Example 1, further comprising one or more optical filters in optical communication with the sample holder, wherein the one or more optical filters are to condition any transmitted light that passes through the coating sample to reduce the intensity of the light outside of wavelengths of interest.

Example 3 includes the system of Example 2, wherein conditioning the transmitted light includes blocking one or more wavelengths of the transmitted light that passes through the coating sample such that one or more wavelengths of interest can be more quickly collected and efficiently evaluated.

Example 4 includes the system of Example 1, wherein the light source is to simulate a spectrum of light including at least one of ultraviolet-A (UV-A), ultraviolet-B (UV-B), visible and infrared.

Example 5 includes the system of Example 1, further comprising an edge light blocker disposed on top of the sample holder, wherein the edge light blocker is to block any light from passing to the spectrometer around an edge of the sample holder.

Example 6 includes the system of Example 1, wherein the sample holder is to be a quartz slide that is transparent to the transmitted light, and the sample holder is to be prepared to receive the coating sample.

Example 7 includes the system of Example 1, wherein the coating sample is to be a paint sample, a primer sample, an adhesive sample, a film, or a peel ply sample.

Example 8 includes the system of Example 1, wherein the opaque cover is to completely block light from passing through the material of the opaque cover.

Example 9 includes the system of Example 8, wherein the opaque cover is to be three-dimensionally (3-D) printed in multiple parts that mate in a lock and key manner.

Example 10 includes the system of Example 1, wherein the spectrometer is to measure light transmission in the range of 0.1 percent (0.1%) to 0.01 percent (0.01%).

Example 11 includes an apparatus for evaluating light transmission through coatings, the apparatus comprising: a sample holder for receiving an amount of light, wherein the sample holder is to hold a coating sample in a position to receive the light; a spectrometer in optical communication with the sample holder, wherein the spectrometer is to measure an amount of the light that passes through the coating sample at each wavelength of the light; and an opaque cover to enclose the spectrometer and at least part of the sample holder, wherein the opaque cover is to prevent extraneous light from entering the spectrometer such that any light passing through the coating sample can be accurately evaluated.

Example 12 includes the apparatus of Example 11, further comprising a light source, wherein the light source is to transmit light through the coating sample, and wherein the light source is to simulate a spectrum of light including at least one of ultraviolet-A (UV-A), ultraviolet-B (UV-B), visible and infrared.

Example 13 includes the apparatus of Example 11, further comprising one or more optical filters in communication with the sample holder, wherein the one or more optical filters are to condition any light that passes through the coating sample to reduce the intensity of the light outside of wavelengths of interest.

Example 14 includes the apparatus of Example 13, wherein conditioning any light that passes through the coating sample includes blocking one or more wavelengths of the light that passes through the coating sample such that one or more wavelengths of interest can be more quickly collected and efficiently evaluated.

Example 15 includes the apparatus of Example 11, further comprising an edge light blocker disposed on top of the sample holder, wherein the edge light blocker is to block any light from passing to the spectrometer around an edge of the sample holder.

Example 16 includes the apparatus of Example 11, wherein the sample holder is to be a quartz slide that is transparent to the light, and the sample holder is to be prepared to receive the coating sample.

Example 17 includes the apparatus of Example 11, wherein the coating sample is to be a paint sample, a primer sample, an adhesive sample, a film, or a peel ply sample.

Example 18 includes the apparatus of Example 11, wherein the opaque cover is to completely block light from passing through the material of the opaque cover.

Example 19 includes the apparatus of Example 18, wherein the opaque cover is to be three-dimensionally (3-D) printed in multiple parts that mate in a lock and key manner.

Example 20 includes the apparatus of Example 11, wherein the spectrometer is to measure light transmission in the range of 0.1 percent (0.1%) to 0.01 percent (0.01%).

Example 21 includes a method for evaluating light transmission through coatings, the method comprising: transmitting, via a light source, light through a coating sample; holding, via a sample holder in optical communication with the light source, the coating sample in a position to receive the transmitted light; measuring, via a spectrometer in communication with the light source, an amount of the transmitted light that passes through the coating sample at each wavelength of the transmitted light; and enclosing, via an opaque cover, the spectrometer and at least part of the sample holder to prevent light other than transmitted light from the light source from entering the spectrometer such that any transmitted light passing through the coating sample can be accurately evaluated.

Example 22 includes the method of Example 21, further comprising conditioning, via one or more optical filters in optical communication with the sample holder, any light that passes through the coating sample into different wavelengths of interest.

Example 23 includes the method of Example 22, wherein conditioning the transmitted light includes blocking one or more wavelengths of the transmitted light that passes through the coating sample such that one or more wavelengths of interest can be more quickly collected and efficiently evaluated.

Example 24 includes the method of Example 21, wherein the light source is to simulate a spectrum of light including at least one of ultraviolet-A (UV-A), ultraviolet-B (UV-B), visible and infrared.

Example 25 includes the method of Example 21, further comprising blocking, via an edge light blocker, any light from passing to the spectrometer around an edge of the sample holder.

Example 26 includes the method of Example 21, wherein the sample holder is to be a quartz slide that is transparent to the light, and the sample holder is to be prepared to receive the coating sample.

Example 27 includes the method of Example 21, wherein the coating sample is to be a paint sample, a primer sample, an adhesive sample, a film, or a peel ply sample.

Example 28 includes the method of Example 21, wherein the opaque cover is to completely block light from passing through the material of the opaque cover.

Example 29 includes the method of Example 28, wherein the opaque cover is to be three-dimensionally (3-D) printed in multiple parts that mate in a lock and key manner.

Example 30 includes the method of Example 21, wherein the spectrometer is to measure light transmission in the range of 0.1 percent (0.1%) to 0.01 percent (0.01%).

The terms "communication," "coupled," "attached," or "connected" can be used herein to refer to any type of relationship, direct or indirect, between the components in question, and can apply to electrical, mechanical, fluid, optical, electromagnetic, electromechanical or other connections. Additionally, the terms "first", "second", "third", etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action can occur, either in a direct or indirect manner.

Those skilled in the art will appreciate from the foregoing description that the broad techniques of the examples of the present disclosure can be implemented in a variety of forms. Therefore, while the examples of this disclosure have been described in connection with particular examples thereof, the true scope of the examples of the disclosure should not be so limited since other modifications will become apparent to the skilled practitioner upon a study of the drawings, specification, and following claims.

We claim:

1. A system for evaluating light transmission through coatings, the system comprising:
a light source, wherein the light source is an accelerated weathering chamber that transmits light through a coating sample, and wherein the light is to be a high-intensity light that simulates direct sunlight;
a sample holder in optical communication with the light source, wherein the sample holder is to hold the coating sample in a position to receive the transmitted light;
a spectrometer in optical communication with the light source, wherein the spectrometer is configured to measure an amount of the transmitted light that passes through the coating sample at each wavelength of the transmitted light, and wherein the spectrometer is configured to measure extremely low levels of light transmission including light transmission levels over a full range of 0.1 percent (0.1%) to 0.01 percent (0.01%); and
an opaque cover to enclose and seal the spectrometer and at least part of the sample holder to improve light detection sensitivity, wherein the opaque cover is to prevent light other than the transmitted light from entering the spectrometer such that any light transmitted through the coating sample can be accurately evaluated, and wherein the high-intensity light source, the sample holder, the spectrometer, and the opaque cover improve the speed of testing coatings and enable the characteristics of the coatings to be tuned for specific applications to prevent damage and prolong the life of the coatings.

2. The system of claim 1, further comprising one or more optical filters in optical communication with the sample holder, wherein the one or more optical filters are to condition any transmitted light that passes through the coating sample to reduce the intensity of the light outside of wavelengths of interest.

3. The system of claim 2, wherein conditioning the transmitted light includes blocking one or more wavelengths of the transmitted light that passes through the coating sample such that one or more wavelengths of interest can be more quickly collected and efficiently evaluated.

4. The system of claim 1, wherein the light source is to simulate a spectrum of light including at least one of ultraviolet-A (UV-A), ultraviolet-B (UV-B), visible and infrared.

5. The system of claim 1, further comprising an edge light blocker disposed on top of the sample holder, wherein the edge light blocker is to block any light from passing to the spectrometer around an edge of the sample holder.

6. The system of claim 1, wherein the sample holder is to be a quartz slide that is transparent to the transmitted light, and the sample holder is to be prepared to receive the coating sample.

7. The system of claim 1, wherein the coating sample is to be a paint sample, a primer sample, an adhesive sample, a film, or a peel ply sample.

8. The system of claim 1, wherein the opaque cover is to completely block light from passing through the material of the opaque cover.

9. The system of claim 8, wherein the opaque cover is to be three-dimensionally (3-D) printed in multiple parts that mate in a lock and key manner.

10. The system of claim 2, wherein at least one of the one or more optical filters is to block up to 99.99 percent (99.99%) of the light that passes through the coating sample.

11. An apparatus for evaluating light transmission through coatings, the apparatus comprising:
a sample holder for receiving an amount of light, wherein the sample holder is to hold a coating sample in a position to receive the light, and wherein the light is to be a high-intensity light that simulates direct sunlight;

a spectrometer in optical communication with the sample holder, wherein the spectrometer is configured to measure an amount of the light that passes through the coating sample at each wavelength of the light, and wherein the spectrometer is configured to measure extremely low levels of light transmission including light transmission levels over a full range of 0.1 percent (0.1%) to 0.01 percent (0.01%); and an opaque cover to enclose and seal the spectrometer and at least part of the sample holder to improve light detection sensitivity, wherein the opaque cover is to prevent extraneous light from entering the spectrometer such that any light passing through the coating sample can be accurately evaluated, and wherein the high-intensity light source, the sample holder, the spectrometer, and the opaque cover improve the speed of testing coatings and enable the characteristics of the coatings to be tuned for specific applications to prevent damage and prolong the life of the coatings.

12. The apparatus of claim 11, further comprising a light source, wherein the light source is an accelerated weathering chamber that transmits light through the coating sample, and wherein the light source is to simulate a spectrum of light including at least one of ultraviolet-A (UV-A), ultraviolet-B (UV-B), visible and infrared.

13. The apparatus of claim 11, further comprising one or more optical filters in communication with the sample holder, wherein the one or more optical filters are to condition any light that passes through the coating sample to reduce the intensity of the light outside of wavelengths of interest.

14. The apparatus of claim 13, wherein conditioning any light that passes through the coating sample includes blocking one or more wavelengths of the light that passes through the coating sample such that one or more wavelengths of interest can be more quickly collected and efficiently evaluated.

15. The apparatus of claim 11, further comprising an edge light blocker disposed on top of the sample holder, wherein the edge light blocker is to block any light from passing to the spectrometer around an edge of the sample holder.

16. The apparatus of claim 11, wherein the sample holder is to be a quartz slide that is transparent to the light, and the sample holder is to be prepared to receive the coating sample.

17. The apparatus of claim 11, wherein the coating sample is to be a paint sample, a primer sample, an adhesive sample, a film, or a peel ply sample.

18. The apparatus of claim 11, wherein the opaque cover is to completely block light from passing through the material of the opaque cover.

19. The apparatus of claim 18, wherein the opaque cover is to be three-dimensionally (3-D) printed in multiple parts that mate in a lock and key manner.

20. The apparatus of claim 13, wherein at least one of the one or more optical filters is to block up to 99.99 percent (99.99%) of the light that passes through the coating sample.

21. A method for evaluating light transmission through coatings, the method comprising:
transmitting, via a light source having a weathering chamber, light through a coating sample, wherein the light is to be a high-intensity light that simulates direct sunlight;
holding, via a sample holder in optical communication with the light source, the coating sample in a position to receive the transmitted light;
measuring, via a spectrometer in communication with the light source, an amount of the transmitted light that passes through the coating sample at each wavelength of the transmitted light, wherein the spectrometer is to measure extremely low levels of light transmission including light transmission levels over a full range of 0.1 percent (0.1%) to 0.01 percent (0.01%); and
enclosing and sealing, via an opaque cover, the spectrometer and at least part of the sample holder to improve light detection sensitivity, wherein the opaque cover is to prevent light other than transmitted light from the light source from entering the spectrometer such that any transmitted light passing through the coating sample can be accurately evaluated, and wherein the high-intensity light source, the sample holder, the spectrometer, and the opaque cover improve the speed of testing coatings and enable the characteristics of the coatings to be tuned for specific applications to prevent damage and prolong the life of the coatings.

22. The method of claim 21, further comprising conditioning, via one or more optical filters in optical communication with the sample holder, any light that passes through the coating sample into different wavelengths of interest.

23. The method of claim 22, wherein conditioning the transmitted light includes blocking one or more wavelengths of the transmitted light that passes through the coating sample such that one or more wavelengths of interest can be more quickly collected and efficiently evaluated.

24. The method of claim 21, wherein the light source is to simulate a spectrum of light including at least one of ultraviolet-A (UV-A), ultraviolet-B (UV-B), visible and infrared.

25. The method of claim 21, further comprising blocking, via an edge light blocker, any light from passing to the spectrometer around an edge of the sample holder.

26. The method of claim 21, wherein the sample holder is to be a quartz slide that is transparent to the light, and the sample holder is to be prepared to receive the coating sample.

27. The method of claim 21, wherein the coating sample is to be a paint sample, a primer sample, an adhesive sample, a film, or a peel ply sample.

28. The method of claim 21, wherein the opaque cover is to completely block light from passing through the material of the opaque cover.

29. The method of claim 28, wherein the opaque cover is to be three-dimensionally (3-D) printed in multiple parts that mate in a lock and key manner.

30. The method of claim 22, wherein conditioning the light includes blocking up to 99.99 percent (99.99%) of the light that passes through the coating sample.

* * * * *